United States Patent
Stone

(10) Patent No.: US 7,302,130 B2
(45) Date of Patent: Nov. 27, 2007

(54) OPTICAL MULTISTAGE NETWORKS

(75) Inventor: Thomas W. Stone, Hellertown, PA (US)

(73) Assignee: Avago Technologies EiberIP (Singapore) Pte Ltd, Singapore (SG)

( * ) Notice: Subject to any disclaimer, the term of this patent is extended or adjusted under 35 U.S.C. 154(b) by 138 days.

(21) Appl. No.: 10/700,982

(22) Filed: Nov. 4, 2003

(65) Prior Publication Data

US 2005/0094933 A1    May 5, 2005

(51) Int. Cl.
*G02B 6/35* (2006.01)
(52) U.S. Cl. .................................................. 385/17
(58) Field of Classification Search ............ 385/16–23
See application file for complete search history.

(56) References Cited

U.S. PATENT DOCUMENTS

| | | | |
|---|---|---|---|
| 5,245,458 A | 9/1993 | Taylor | |
| 5,692,077 A | 11/1997 | Stone et al. | |
| 5,706,383 A | 1/1998 | Malcuit et al. | |
| 5,771,320 A | 6/1998 | Stone | |
| 5,937,115 A * | 8/1999 | Domash | 385/16 |
| 6,072,923 A | 6/2000 | Stone | |
| 6,236,775 B1 | 5/2001 | Nir | |
| 6,356,679 B1 * | 3/2002 | Kapany | 385/18 |
| 6,430,329 B1 | 8/2002 | Nir | |
| 6,748,130 B2 * | 6/2004 | Oikawa | 385/17 |
| 6,999,649 B1 * | 2/2006 | Chen et al. | 385/18 |
| 2002/0005966 A1 * | 1/2002 | Stone | 359/117 |

OTHER PUBLICATIONS

Y. Yang, J. Wang and Y. Pan, "Permutation Capability of Optical Multistage Interconnection Networks." J. of Parallel and Distributed Computing, 60, 72-91 (2000).

* cited by examiner

*Primary Examiner*—Michelle Connelly-Cushwa
*Assistant Examiner*—Jerry T Rahll

(57) ABSTRACT

Systems and methods for low loss, high speed exchange optical switching. The optical switch of this invention includes one or more a switchable diffraction gratings. The optical switch of this invention is capable of connecting two or more input optical beams to two more output locations. Optical noise suppression means for switchable diffraction gratings can be utilized to suppress crosstalk.

13 Claims, 7 Drawing Sheets

SWITCHING GRATINGS, PIXELLATED

SWITCHING GRATINGS, PIXELLATED

PIXELLATED SWITCHABLE HOLOGRAPHIC MIRRORS

OPTICAL MULTISTAGE NETWORKS

STATEMENT REGARDING FEDERALLY SPONSORED RESEARCH OR DEVELOPMENT

This invention was made partially with U.S. Government support from the U.S. Air Force under Contract No. F30602-98-C-0079. The U.S. Government has certain rights in the invention.

BACKGROUND OF THE INVENTION

This invention relates generally to optical switches, and, more particularly, to bypass exchange optical switches and multistage networks.

Electronic multi-stage interconnection networks (MINs) are as important interconnecting scheme for communication and parallel computing. Optical communications systems with optical switches are possible solutions to the increasing demands for communication system capacity. Optical systems with optical switches are also of interest in parallel computing. An optical MIN would find use in both communications systems and parallel computing. There is a need for low loss, high-speed optical MINs.

Presently available optical MINs exhibit path dependent loss and optical crosstalk. There is a need for low loss optical MINs and for crosstalk suppression techniques for optical MINS.

It is an object of this invention to provide low loss, high-speed optical MIN systems.

It is another object of this invention to provide methods and systems for crosstalk suppression in optical MINs.

BRIEF SUMMARY OF THE INVENTION

The objects set forth above as well as further and other objects and advantages of the present invention are achieved by the embodiments of the invention described hereinbelow.

Systems and methods for low loss, high speed exchange optical switching are disclosed.

The optical switch of this invention includes one or more optical switching elements, where the optical switching element includes a switchable optical deviating element. The optical switch of this invention is capable of connecting two or more input optical beams to two more output locations.

In one embodiment, the switchable optical deviating element includes a switchable diffraction grating. Optical noise suppression means for switchable diffraction gratings can be utilized to suppress crosstalk.

For a better understanding of the present invention, together with other and further objects thereof, reference is made to the accompanying drawings and detailed description and its scope will be pointed out in the appended claims.

BRIEF DESCRIPTION OF THE SEVERAL VIEWS OF THE DRAWING

FIG. 2a depicts a graphical schematic representation of another state of the switch of FIG. 1a;

DETAILED DESCRIPTION OF THE INVENTION

Systems and methods for low loss, high speed bypass exchange optical switching are disclosed hereinbelow.

Figure 1A:
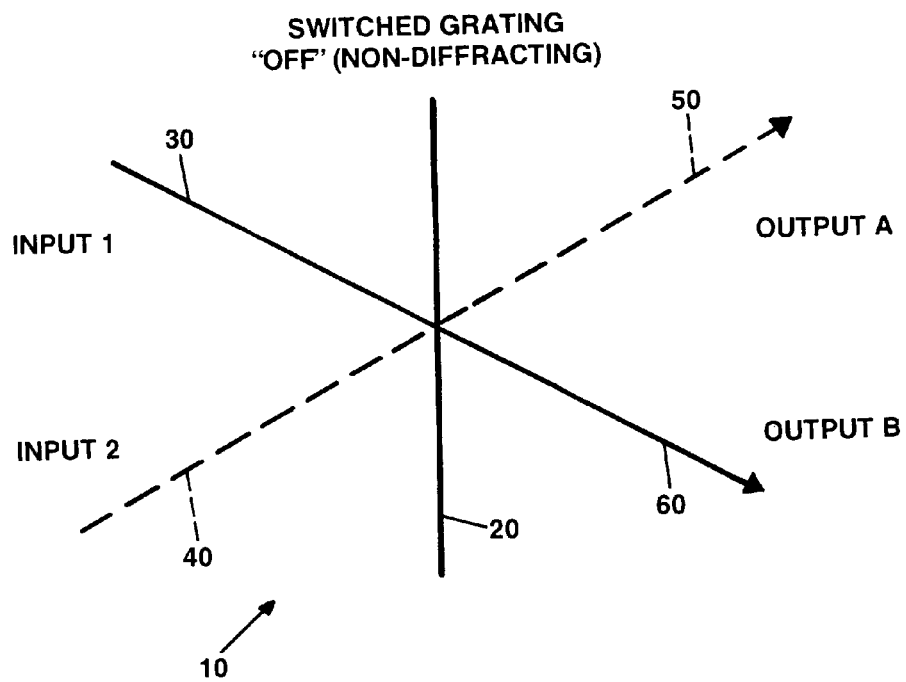
FIG. 1a depicts a graphical schematic representation of an embodiment of a two input, two output optical switch of this invention.

An embodiment of an optical switching element 10 of this invention is shown in FIG. 1a. Referring to FIG. 1a, the optical switching element 10 of this invention includes a switchable deviating element 20 capable of deviating any of two input optical beams 30, 40 to any of two output locations 50, 60.

One embodiment of the switchable element utilized in the optical switches of this invention is a switchable diffraction element (grating) such as that described in U.S. Pat. Ser. No. 5,771,320, herein incorporated by reference. The embodiments of the optical switching and routing systems described in U.S. Pat. Ser. No. 5,771,320 utilize volume phase diffraction (holographic) gratings that permit switching of the incident energy between two or more orders. The primary mechanisms considered which permit this diffracted-order switching are electrical switching, optical switching, and polarization switching. The switched gratings can be optically switched, electrically switched, polarization switched, or switched based on other mechanisms. Currently it is preferred that electrical and polarization switching techniques are used with the present invention since they are extremely fast (switching times in the microsecond regime). Electrical switching can be obtained in materials such as Polaroid DMP-128 photopolymer (as described below) or, for example, polymer dispersed liquid crystals. So as to provide an example of a switching mechanism, one of the electrical switching techniques is described below. Further, switching to intermediate diffraction efficiency status permits switching of a given input signal to more than one output channel ("fan out" as opposed to "one to one" switching).

It has been previously demonstrated in the literature that high efficiency volume diffraction gratings which are recorded in permeable media, such as the DMP-128 photopolymer manufactured by Polaroid Corporation, Cambridge, Mass., can be made to be rapidly switchable between high and low diffraction efficiency states under electric control by imbibing the structure with nematic liquid crystals. In this technique the crystals are rotated by the applied electric field and their refractive index is switched between ordinary and extraordinary values. By choosing the materials so that one of these switchable values matches that of the host grating material, the grating modulation is effectively switched "off"

and "on," thus switching the diffraction efficiency of the gratings and toggling the diffracted beam between the 0 and first diffracted order.

Another embodiment of the switchable element utilized in the optical switches of this invention is a switchable mirror, such as that described in U.S. Pat. Ser. No. 6,072,923. The switchable mirrors used in U.S. Pat. Ser. No. 6,072,923 can be made using various technologies, such as, but not limited to, volume holographic mirrors, multilayer mirrors, deformable mirrors and micro electromechanical mirrors. But the common feature is that the mirrors exhibit a reflectance that is variable and controllable. When in an "off" state, the mirrors are transparent (or, alternatively, displaced out of the path of the incident beam). When in an "on" state, the mirrors are reflective (or, alternatively, displaced into the path of the incident beam).

A significant benefit of using the switched mirror elements described in U.S. Pat. Ser. No. 6,072,923 in place of switched transmission gratings is that there is little or no angular dispersion of the optical channel or beam when steered with these mirror elements. Thus multiple wavelengths or broad-spectrum light can be routed, delayed, interconnected, or switched with little or no dispersive angular deviation of the optical carrier. In one of the preferred embodiments of the invention disclosed in U.S. Pat. Ser. No. 6,072,923, volume phase holographic switchable mirrors are used to enable switching of the incident energy between the transmitted and reflected directions. Such switchable mirrors may be controlled by electrical switching, optical switching, and polarization switching of the mirrors, in a manner similar to that discussed above for holographic gratings.

Figure 1B:
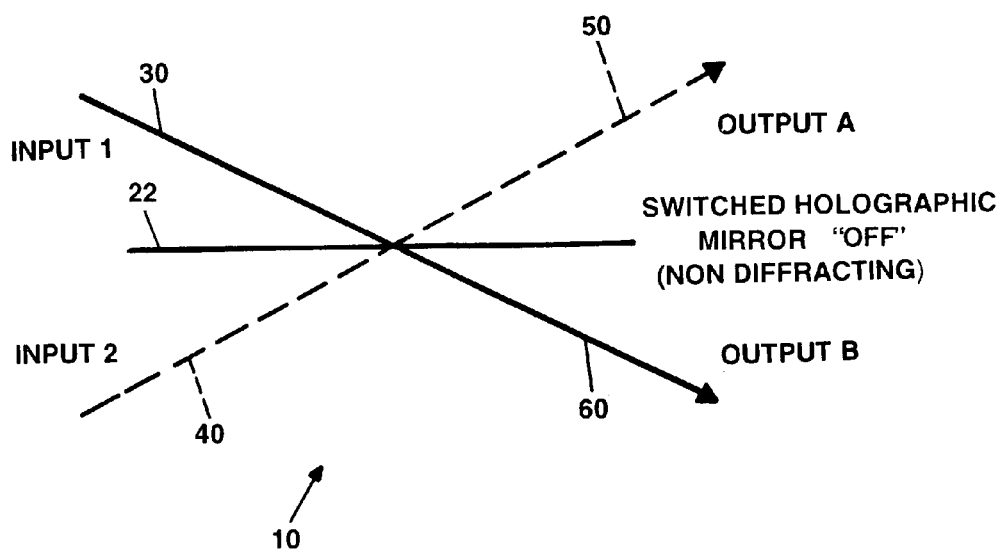
FIG. 1b depicts a graphical schematic representation of another embodiment of a two input, two output optical switch of this invention.

Another embodiment of the optical switching element 10 of this invention is shown in FIG. 1b. Referring to FIG. 1b, the optical switching element 10 of this invention includes a switchable mirror 22 as the deviating element 20.

Figure 1C:
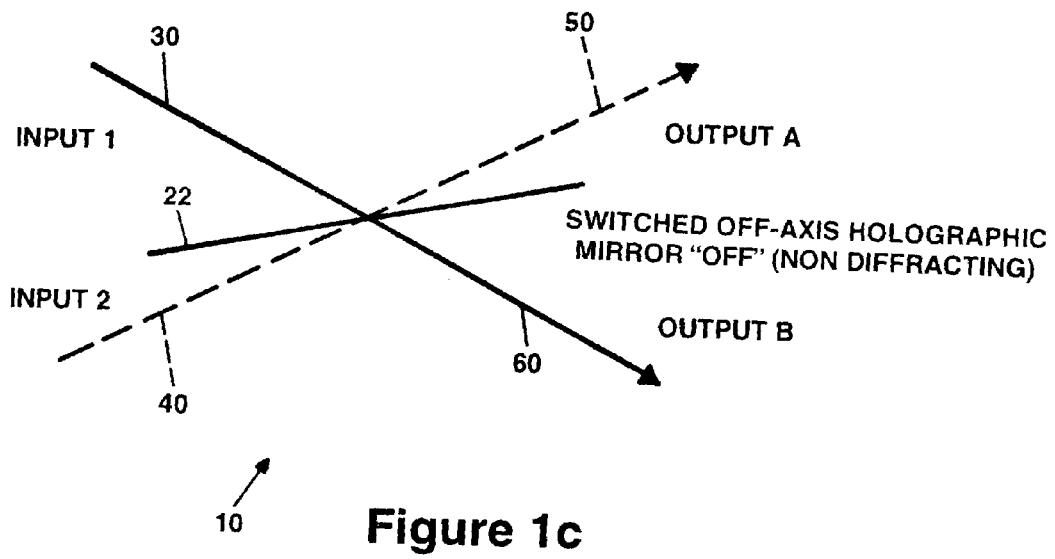
FIG. 1c depicts a graphical schematic representation of yet another embodiment of a two input, two output optical switch of this invention.

Yet another embodiment of the optical switching element 10 of this invention is shown in FIG. 1c. Referring to FIG. 1c, the optical switching element 10 of this invention includes an off-axis switchable mirror 24 as the deviating element 20.

In FIGS. 1a, 1b, 1c the deviating element 20 (the switchable mirror 22 or the off-axis switchable mirror 24 in the embodiments of FIGS. 1b and 1c, respectively) is in the "off" state.

Figure 2A:
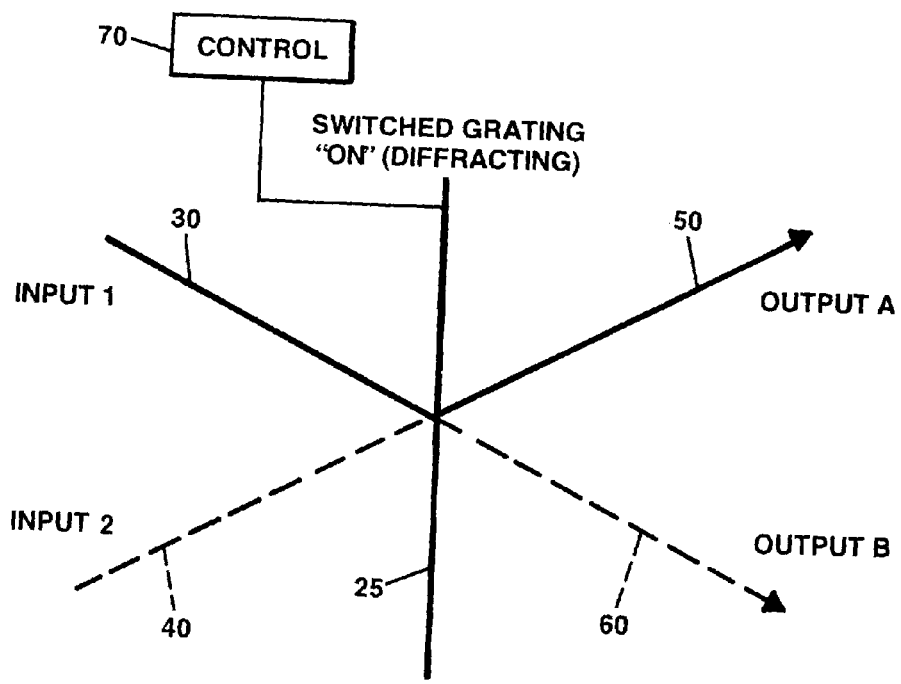
Figure 2B:
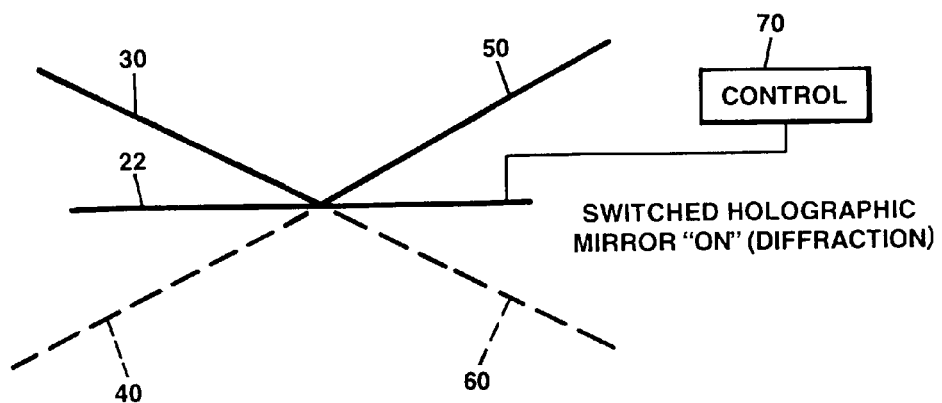
FIG. 2b depicts a graphical schematic representation of another state of the switch of FIG. 1b.
Figure 2C:
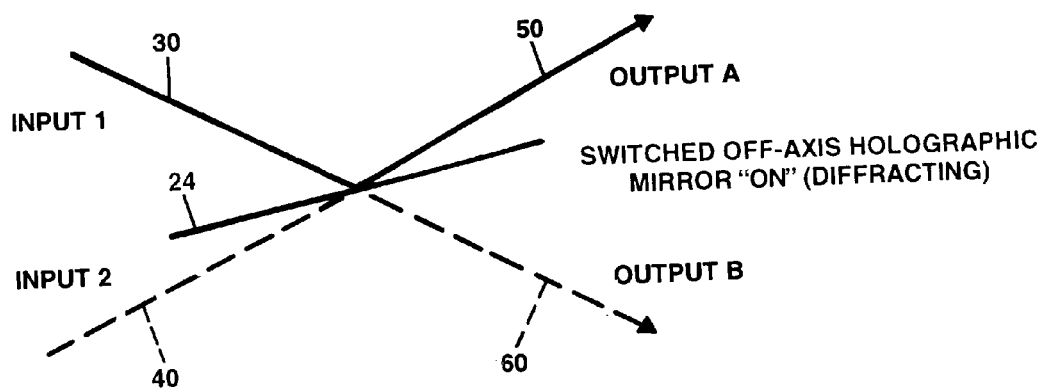
FIG. 2c depicts a graphical schematic representation of another state of the switch of FIG. 1c.

FIGS. 2a, 2b, and 2c show another state of the embodiments of FIGS. 1a, 1b and 1c, respectively. In the embodiment of the optical switching element 10 of this invention shown in FIG. 2a, the optical switching element 10 of this invention includes a switchable diffraction element (grating) 25 capable of deviating any of two input optical beams 30, 40 to any of two output locations 50, 60.

In the embodiment of the optical switching element 10 of this invention shown in FIG. 2b, the optical switching element 10 of this invention includes a switchable mirror element 22 capable of deviating any of two input optical beams 30, 40 to any of two output locations 50, 60.

In the embodiment of the optical switching element 10 of this invention shown in FIG. 2c, the optical switching element 10 of this invention includes an off-axis switchable mirror element 24 capable of deviating any of two input optical beams 30, 40 to any of two output locations 50, 60.

Means for directing at least two free space input optical beams onto the switchable diffraction element include an array of optical fibers, semiconductor lasers (e.g., Vertical Cavity Surface Emitting Lasers or VCSELs), free space beams, or other guides or sources and appropriate positioning and/or optical systems.

In the embodiments of the shown in FIGS. 2a, and 2b switching is controlled by the application of voltages from voltage source 70. During operation of the optical switching element 10 of this invention shown in 2a, 2b or 2c, each of the two input optical beams 30, 40 are switched to one of the two output locations 50, 60. The switching is effectuated by the application of voltage from voltage source 70 to the switchable deviating element 20. The voltage from voltage source 70 switches the element between a non- deviating ("off") state and a deviating ("on") state. (For clarity in the drawings, switching and control signals, such as those shown in FIGS. 2a and 2b, are not shown in FIGS. 2c, 3, 4a, 4b, and 5 herein below. It should be noted that control signals are used to switch the deviating elements.) The input optical beams 30, 40 are received at different output locations depending on the state of the deviating element 20. Table 1 shows the output of the optical switching element 10 corresponding to the state of the switchable deviating element 20.

TABLE 1

| | State of Switchable Deviating Element 20 | |
|---|---|---|
| | OFF | ON |
| Output A (50) | Input 2 (40) | Input 1 (30) |
| Output B (60) | Input 1 (30) | Input 2 (40) |

The optical switching element 10 of this invention provides the basic component for an optical network of this invention. The optical network of this invention includes one or more optical switching elements 10. The optical network of this invention is capable of connecting any of two or more input optical beams to any of two or more output locations.

Traditional multi-stage interconnection network architectures can be implemented in the optical network of this invention, In one embodiment, the optical network of this invention is a Banyan network. In another embodiment, the optical network of this invention is a Benes network. (Details of traditional MINs architectures are given, for example, in Y. Yang, J. Wang, Y. Pan, "Permutation Capability of Optical Multistage Interconnection Networks", J. of Parallel and Distributed Computing, 60, 72-91 (2000).)

In the embodiment in which optical switching element 10 of this invention includes a switchable grating, the optical multistage interconnection network of this invention includes cascaded switchable gratings. The cascaded switchable gratings are pixellated at a scale matching the multistage interconnection networks.

In the embodiment of the optical switching element 10 of this invention shown in FIGS. 2a, 2b, and 2c and Table 1, the optical switching element 10 operates as a two function two-by-two switch. In other embodiments, the optical switching element 10 operates as a three function two by two switch in which the third state is a broadcast of both signals in both directions, or as a four function switch at nodes where one signal is broadcast to both outputs. To obtain the three or four function two by two switch, in one embodiment, the deviating element 20 is a switchable diffraction grating (such as a switchable volume holographic grating) with controllable diffraction efficiency. In that embodiment, when the grating efficiency is switched 50%, half of each input 20, 30 is distributed to each output 40, 50.

Other embodiments of the optical multistage interconnection network of this invention in the form of hypercubes, crossbar switches, and other shuffle-exchange networks can be implemented.

In the embodiment in which optical switching element 10 of this invention includes a pixellated switchable grating, each pixel element in the pixellated switchable grating is separately controllable and functions as a local bypass/exchange switch. In some embodiments of the optical network of this invention, each stage in the interconnection network is implemented using a symmetric grating such those described in U.S. Pat. Ser. No. 5,771,320. Pixellation of the grating is used to provide for the separate control of the individual beam routes and can be separately controllable at each beam node. All the gratings may be made identical and can be of the symmetric or asymmetric (non-slanted or slanted) grating types. The embodiments shown in FIG. 1*a*, 1*b*, 2*a*, 2*b* and FIGS. 3, 4*a*, 4*b*, and 5 below utilize symmetric gratings. Embodiments of FIGS. 1*c* and 2*c* can utilize asymmetric volume holographic mirrors.

Figure 3:
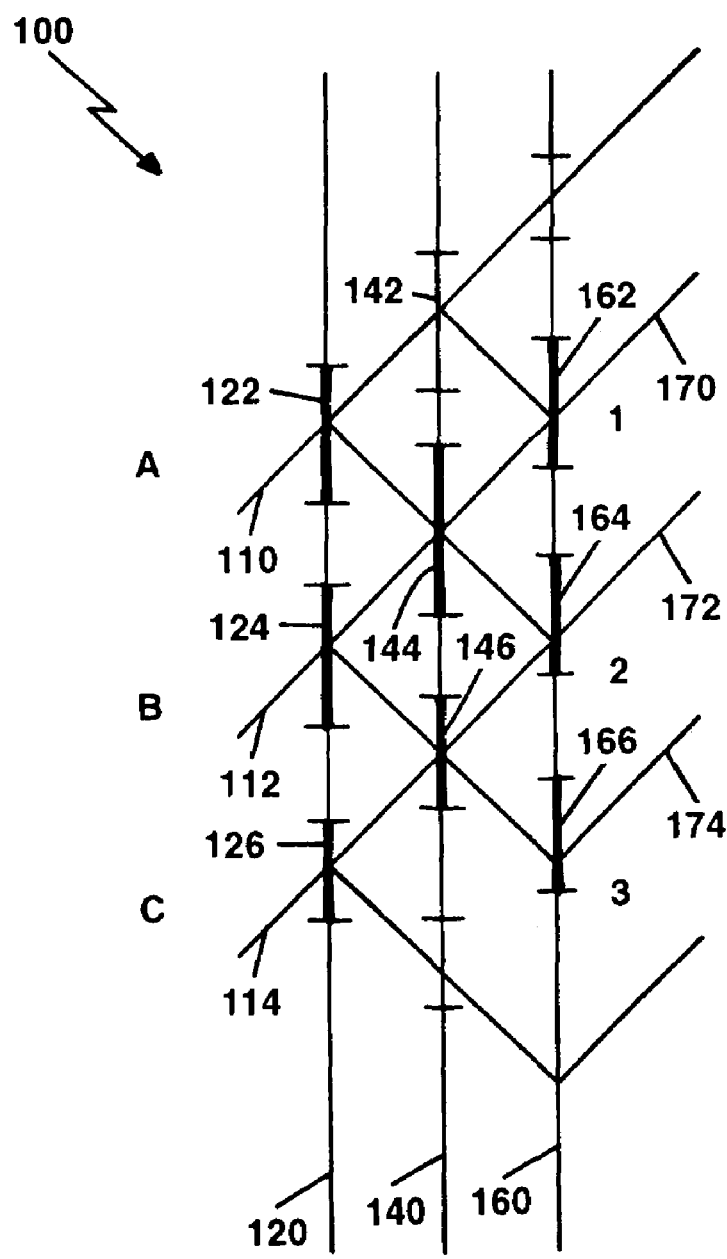
FIG. 3 depicts a graphical schematic representation of an embodiment of an optical network of this invention.

A graphical schematic representation of an embodiment 100 of an optical network of this invention is shown in FIG. 3. Referring to FIG. 3, three input beams 110, 112, 114, a single beam at each input node, are routed among three output locations 170, 172, 174 by three pixellated switchable gratings 120, 140, 160. Each pixellated switchable gratings 120, 140, 160 has three pixel elements 122, 124, 126, 142, 144, 146, 162, 164, 166. Each pixel element 122, 124, 126, 142, 144, 146, 162, 164, 166 is separately controllable and functions as a local switching element.

Figure 4A:
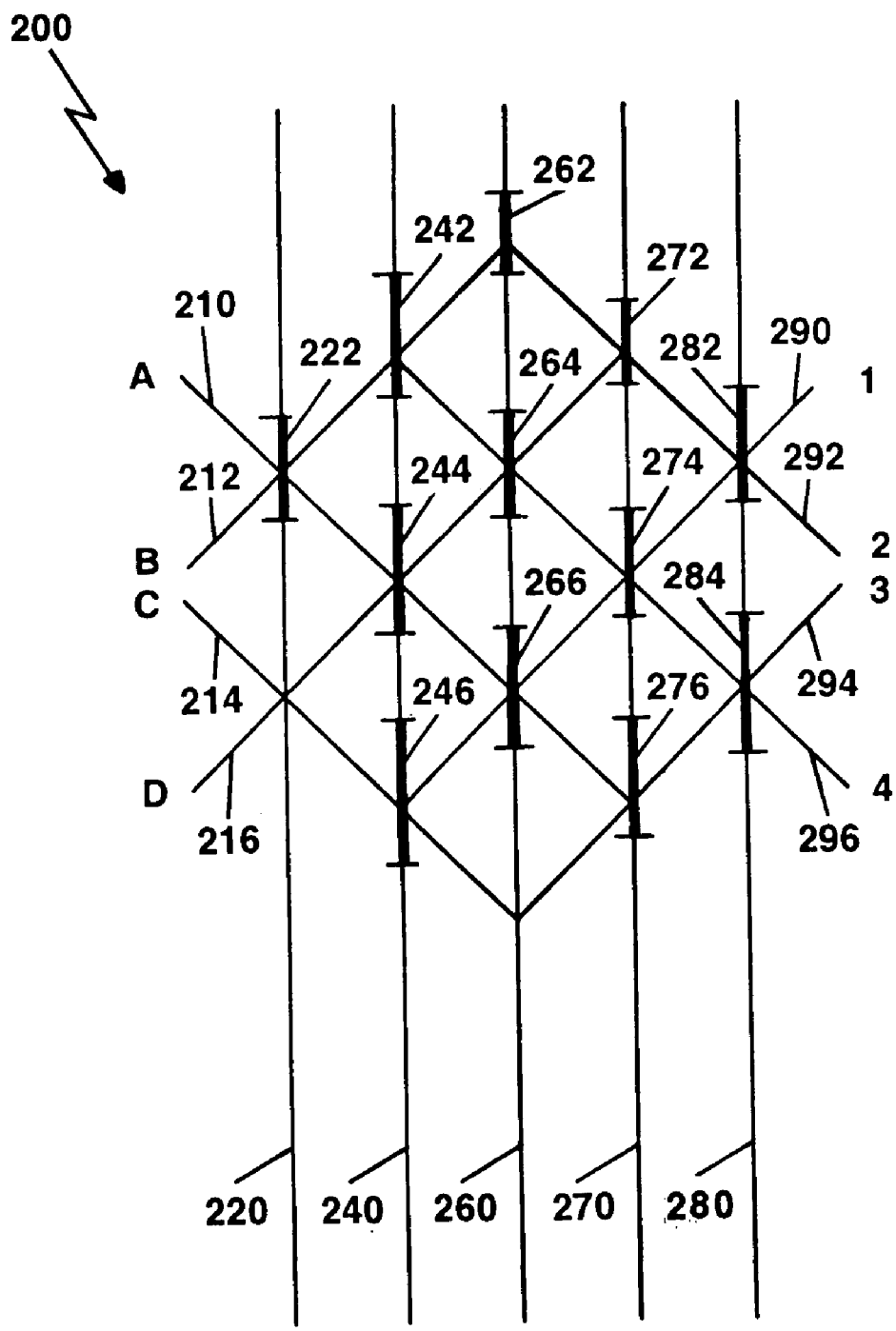
FIG. 4a depicts another graphical schematic representation of an embodiment of an optical network of this invention.

An embodiment 200 of an optical network of this invention in which two beams are provided at each input node is shown in FIG. 4*a*. In the embodiment of the optical network 200 of this invention shown in FIG. 4*a*, the optical deviating elements include pixellated switchable diffraction gratings 220, 240, 260, 270, 280.

Referring to FIG. 4*a*, four input beams 210, 212, 214, 216 are provided to input nodes. Each pixel element 222, 224 from the first pixellated switchable grating 220 receives two beams and functions as a local bypass/exchange switching element. The pixel elements 242, 244, 246, 262, 264, 266, 268, 272, 274, 276, 282, 284 in the second 240, third 260, fourth 270, and fifth 280 pixellated switchable gratings route the input beams to the output locations 290, 292, 294, 296. Since not all pixel elements need to act as switching elements in order to enable all possible combinations of output states, the pixel elements that are enabled (switched) can be selected in order to minimize crosstalk. Other tradeoffs with the number of cascaded switched grating planes, density of switched grating planes, the lateral extent of the switched grating planes are discussed in FIG. 5.

Figure 4B:
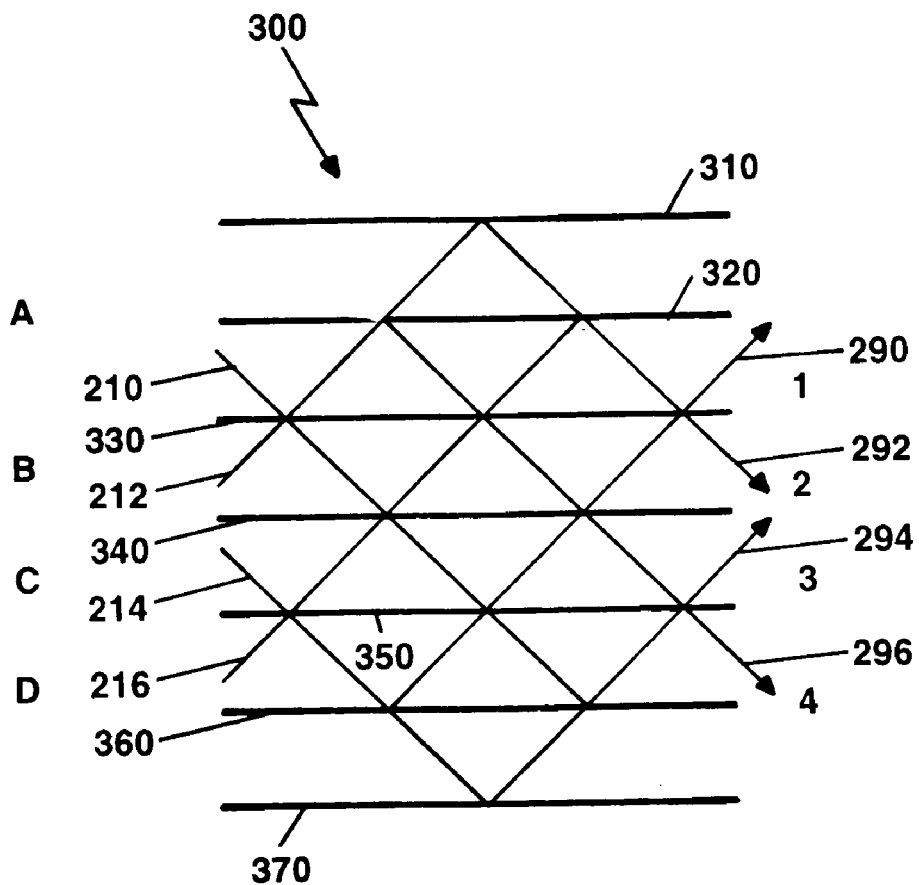
FIG. 4b depicts yet another graphical schematic representation of an embodiment of an optical network of this invention; and, FIG. 5 depicts a graphical schematic representation of an embodiment of an optical network of this invention including noise absorption means.

Another embodiment 300 of an optical network of this invention in which two beams are provided at each input node is shown in FIG. 4*b*. In the embodiment of the optical network 300 of this invention shown in FIG. 4*b*, the optical deviating elements include pixellated switchable mirrors (such as, pixellated switchable holographic mirrors) 320, 330, 340, 350, 360, 370, 380.

Referring to FIG. 4*b*, four input beams 210, 212, 214, 216 are provided to input nodes. Each of the leftmost pixel elements 342, 362 from the third 340 and fifth 360 pixellated switchable mirrors receives two beams and functions as a local bypass/exchange switching element. The other pixel elements in the pixellated switchable mirrors 320, 330, 340, 350, 360, 370, 380 route the input beams to the output locations 290, 292, 294, 296.

In the embodiments of an optical network of this invention shown in FIGS. 2*a*, 2*b*, 2*c*, 3, 4*a*, 4*b* and 5, the input optical beams, the output locations, and the optical switching elements are substantially in the same plane.

Although the above described embodiments of the optical network of this invention are two dimensional embodiments, it should be noted that the two dimensional embodiments can be layered out-of-plane (stacked) to obtain three dimensional arrays of networks. It should be noted that cross shifting (out-of-plane) switching elements and networks (in one embodiment, comprised of planar embodiments disposed perpendicular to the plane of the preceding planar embodiment) can be utilized to form a three dimensional network.

Figure 5:
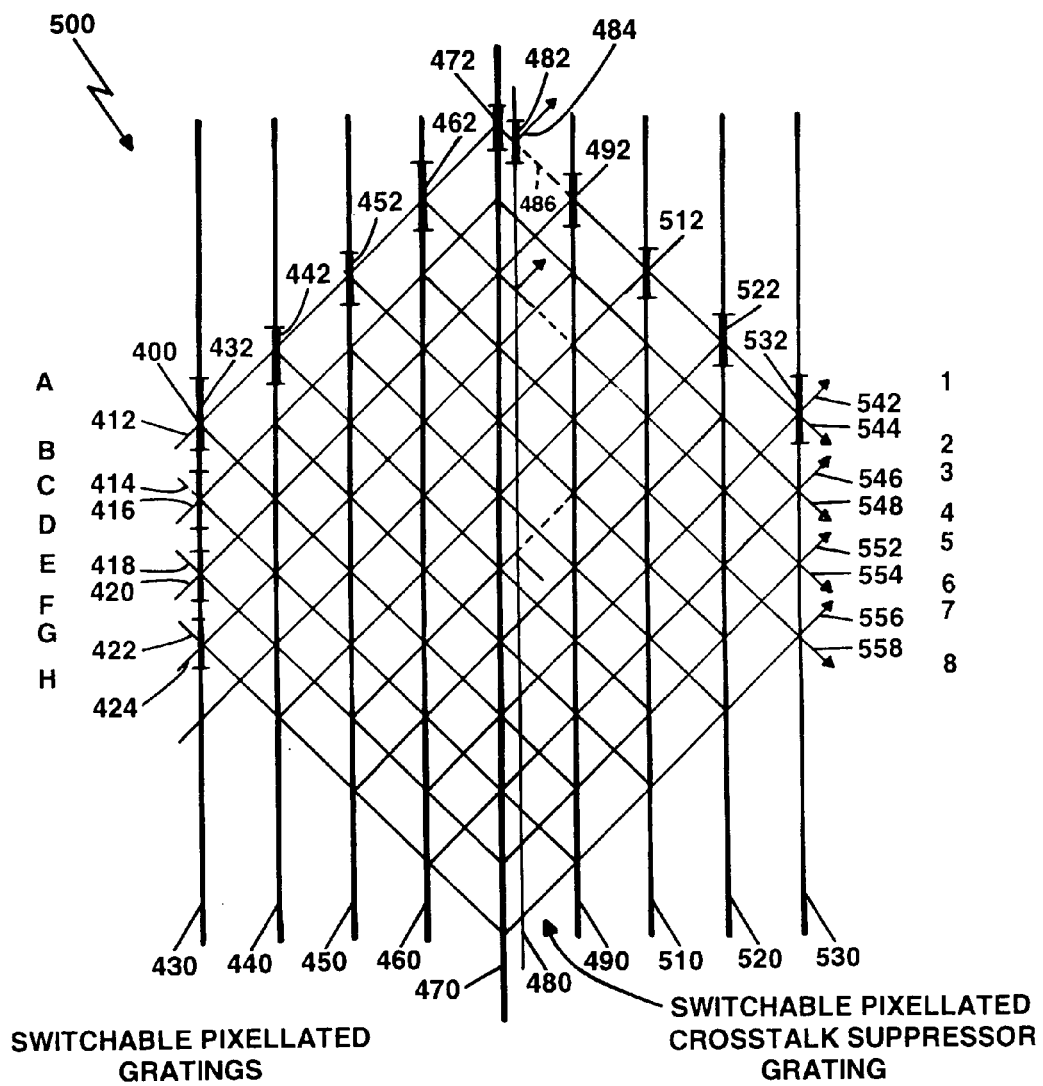

An embodiment 300 of an optical network of this invention including noise/crosstalk suppression means is shown in FIG. 5. Eight input channels 400-424 are incident on four pixel elements (hereinafter also referred to as pixels) of a first switchable grating plane 430. In other configurations these input channels are input on more than four pixels of the first grating, e.g., one per pixel spanning seven pixels, or one per every other pixel spanning fifteen pixels. Each input channel is incident on one of two beam propagation directions that are coupled by the grating as described earlier. For the case of volume switchable gratings (e.g., as fabricated in polymer dispersed liquid crystal materials using holographic techniques) these two beam directions typically correspond to the zero and first diffracted orders.

The eight input beams form a pattern of intersecting beams (forming planes of intersection as shown in FIG. 5) beyond the first grating. This embodiment also comprises eight additional pixellated switchable diffraction gratings 440-470 and 490-530, that are cascaded with regular spacing that coincides with every other plane of intersection of the input beams as shown in FIG. 5. Each of the switchable gratings is pixellated with individually controllable pixels located at the intersections of the array of beams and the switchable gratings as shown in FIG. 5. Each of these individually controllable switchable grating pixels is controlled by a control signal and controlling means as described earlier, and is not shown in FIG. 5. Other configurations contain more or less than the nine switched grating planes shown in FIG. 5, and place switchable gratings at each plane of intersection (as shown in FIG. 4*a*) or at varied planes of intersection. Additional switched grating planes may be introduced also by extending the cascade of gratings. The final grating 530 is followed by eight output ports 542-558 located at 4 switched grating pixels. In other configurations these output channels are output on more than four pixels of the final grating, e.g., one per pixel spanning seven pixels, or one per every other pixel spanning fifteen pixels.

In operation the individual pixels are switched on or off to effect the desired routing or switching of the input beams to the output channels. For example, one of the many routes possible for switching/routing input 412 (B) to output 542 (1) is to switch off grating pixels 432-462, switch on pixel 472, and switch off pixels 482-522, and finally switch on the pixel corresponding to channel 542. By varying the number of grating planes and active lateral extent of the planes, more than one mapping of input beams to output channels may be implemented. Insertion loss and minimization of crosstalk are two of the criteria that may be used to select among the possible routes, and optimum control patterns may be stored in a look-up table or calculated iteratively or algorithmically.

Another effective method for reducing levels of crosstalk is to introduce additional pixellated switched grating planes, such as noise suppression grating 480 shown in FIG. 5. This crosstalk suppression grating is located between usual intersection planes described earlier, where all beam paths may be spatially separated. This results in closer spaced pixels than in the other gratings, and they may be used to deflect crosstalk signals traveling in non-selected paths out of the system as shown in FIG. 5.

For example, three of the pixels of crosstalk suppression grating 480 in FIG. 5 are shown "on", or diffracting. In the switching state of system 500 where these paths do not contain a selected path, light propagating in these channels is crosstalk signal. The "on" crosstalk suppression pixels can then be used to deflect these crosstalk signals out of the system as shown in FIG. 5. Alternatively other crosstalk suppression devices such as switchable scatterers, or saturable absorber or active crosstalk devices as described in U.S. Pat. Nos. 5,692,077 and 5,706,383, both of which are herein incorporated by reference, can be used.

Additional levels of crosstalk suppression may be obtained by inputting the L input channels over more than L/2 grating pixels as described above. One such case was illustrated in FIG. 3, where L input channels are input over L pixels. More extreme examples include the case where L input channels are input over greater than L switched grating pixels. Similarly, outputting the M channels over more than M/2 pixels can reduce crosstalk levels. These approaches decrease the number of nodes where two signals are simultaneously switched. The better the switch purity (switching contrast or crosstalk level) in the switched gratings, the less important such crosstalk suppression approaches become.

Although the above described embodiments of the optical network utilizing switchable diffraction elements have shown as utilizing substantially symmetrical switchable diffraction element, it should be noted that substantially asymmetrical switchable diffraction elements can also be utilized.

Although the invention has been described with respect to various embodiments, it should be realized this invention is also capable of a wide variety of further and other embodiments within the spirit and scope of the appended claims.

What is claimed is:

1. An optical network comprising:
   a switchable deviating element; and
   means for directing at least two input optical beams onto said switchable deviating element; said at least two input optical beams being directed onto substantially a same location on said switchable deviating element;
   said switchable deviating element enabling connection of any of said at least two input optical beams among at least two output locations; and
   one or more switchable pixellated crosstalk suppressor grating(s).

2. An optical network comprising: an array of switchable deviating elements each comprising switchable pixel elements, each switchable pixel element operable to connect at least two optical beams from at least two input locations to at least two output locations;
   one or more switchable pixellated crosstalk suppressor grating(s); and
   wherein a first switchable deviating element receives a plurality of input optical beams prior to other switchable deviating elements and each of a plurality of switchable pixel elements in the first switchable deviating element receives at least two input optical beams.

3. The optical network of claim 2 wherein the switchable pixel elements each comprises a substantially asymmetrical switchable diffraction pixel element.

4. The optical network of claim 2 wherein the switchable pixel elements each comprises a substantially symmetrical switchable pixel element.

5. The optical network of claim 1 wherein the at least two optical beams, the at least two output locations, the at least two input locations, and the first switchable deviating element are substantially in a same plane.

6. The optical network of claim 1 wherein the switchable deviating pixel elements each comprises a switchable volume holographic pixel element.

7. The optical network of claim 6 wherein the switchable volume holographic pixel elements each comprises a polymer liquid crystal dispersed pixel element.

8. The optical network of claim 1 wherein the switchable deviating pixel elements each comprises a switchable mirror pixel element.

9. The optical network of claim 8 wherein the switchable deviating pixel elements each comprises a switchable holographic mirror pixel element.

10. A method of interconnecting optical signals comprising the steps of:
    providing an array of switchable deviating elements each comprising switchable pixel elements;
    providing one or more switchable pixellated crosstalk suppressor grating(s);
    directing at least two input optical beams to each of a plurality of switchable pixel elements in a first switchable deviating element prior to other switchable deviating elements; and
    directing each one of the at least two input optical beams from at least two input locations to at least two output locations for each of the plurality of switchable pixel elements in the first switchable deviating element.

11. The method of claim 10 wherein the at least two input optical beams, the at least two output locations, and the first switchable deviating element are substantially in a same plane.

12. The method of claim 10 further comprising the step of:
    providing switching and control signals to each switchable pixel element, said switching and control signals enabling the directing the at least two input optical beams.

13. A method of interconnecting optical signals comprising the steps of:
    providing a switchable deviating element;
    directing at least two input optical beams onto substantially a same location on the switchable deviating element;
    directing each one of the at least two input optical beams among at least two output locations;
    receiving one optical beam from one of the at least two input optical beams at least one output location from the at least two output locations; and
    providing one or more switchable pixellated crosstalk suppressor grating(s).

* * * * *

UNITED STATES PATENT AND TRADEMARK OFFICE
CERTIFICATE OF CORRECTION

PATENT NO. : 7,302,130 B2 Page 1 of 1
APPLICATION NO. : 10/700982
DATED : November 27, 2007
INVENTOR(S) : Thomas W. Stone It is certified that error appears in the above-identified patent and that said Letters Patent is hereby corrected as shown below:

Column 8, Line 9, Claim 5, delete "claim 1" and insert -- claim 2 --;

Column 8, Line 13, Claim 6, delete "claim 1" and insert -- claim 2 --;

Column 8, Line 19, Claim 8, delete "claim 1" and insert -- claim 2 --.

Signed and Sealed this

Eighth Day of June, 2010

David J. Kappos
*Director of the United States Patent and Trademark Office*